United States Patent [19]

Barnholt et al.

[11] Patent Number: 5,303,985
[45] Date of Patent: Apr. 19, 1994

[54] CAST ONE-PIECE AXLE HOUSING

[75] Inventors: Mark C. Barnholt; John Oswald; Ronald I. Rhoads, all of Fort Wayne, Ind.

[73] Assignee: Dana Corporation, Toledo, Ohio

[21] Appl. No.: 763,901

[22] Filed: Sep. 23, 1991

[51] Int. Cl.⁵ .............................................. B60B 35/08
[52] U.S. Cl. ................................ 301/124.1; 301/137; 74/607
[58] Field of Search ............ 74/606 R, 607; 148/139, 148/141; 164/76.1; 301/124.1, 137, 125

[56] References Cited

U.S. PATENT DOCUMENTS

| | | | |
|---|---|---|---|
| 1,439,787 | 12/1922 | Beechler | 301/124 H |
| 1,621,007 | 3/1927 | Ford | |
| 1,715,135 | 5/1929 | Lambert | 301/124 X |
| 1,978,685 | 10/1934 | Mogford et al. | 301/124 H |
| 2,148,714 | 2/1939 | Urschel | 301/124 R |
| 3,405,952 | 10/1968 | Hertel et al. | 74/607 X |
| 3,715,935 | 2/1973 | Ebey | |
| 4,048,466 | 9/1977 | Toth et al. | |
| 4,843,906 | 7/1989 | Kuwahara | |
| 4,893,524 | 1/1990 | Ohashi et al. | |
| 4,921,036 | 5/1990 | Kuwahara | |

FOREIGN PATENT DOCUMENTS

| | | | |
|---|---|---|---|
| 590379 | 1/1960 | Canada | 301/124 R |
| 2154186 | 9/1985 | United Kingdom | 74/607 |

Primary Examiner—Russell D. Stormer
Attorney, Agent, or Firm—MacMillan, Sobanski & Todd

[57] ABSTRACT

A structure for a housing for an axle assembly and method for manufacturing same is disclosed. The housing includes a tube which is formed by casting. The tube is cast having a brake flange, a spring seat, a shock absorber pad, and an outer end for mounting wheel bearings, all of which are integrally formed therewith. The tube is generally hollow and cylindrical in shape, but is formed having an outer circumferential surface which is generally circular in shape and an inner circumferential surface which is generally oval in shape. Thus, the wall thickness of the tube is not uniform about the circumference thereof. Rather, the wall thicknesses of the upper and lower portions of the tube are somewhat greater than the wall thicknesses of the side portions thereof. The wall thicknesses of the upper and lower portions of the tube are sized to accommodate vertically oriented loads induced therein which are generally larger than horizontally oriented loads which are normally encountered in use. The tube is cast from an iron alloy and is subjected to an austempering heat treatment process.

25 Claims, 2 Drawing Sheets

CAST ONE-PIECE AXLE HOUSING

BACKGROUND OF THE INVENTION

This invention relates in general to vehicle axle assemblies and in particular to an improved structure for a housing for such an axle assembly and a method for manufacturing same.

Axle assemblies are well known structures which are in common use in most vehicles. Such axle assemblies include a number of rotatable components which transmit rotational power from an engine of the vehicle to the wheels thereof. These rotatable components are usually enclosed in protective non-rotatable housing. The housing typically includes a central carrier (which rotatably supports a differential mechanism therein) having a pair of outwardly extending tubes (which enclose the axle shafts extending from the differential to the wheels of the vehicle). In the past, the tubes have been formed from sections of hollow cylindrical steel tubes which have been welded, bolted, or otherwise secured to the carrier to form the axle housing.

The tubes of these axle housings are frequently provided with one or more additional components for various purposes. For example, it is generally desirable to provide a circumferentially extending flange about the tube near the outer end thereof to function as a mounting surface for the components of the brake for that wheel. Also, a seat is commonly provided on the tube for securing a plurality of leaf springs or similar means for resiliently connecting the frame of the vehicle to the axle housing. Lastly, it is known to provide a pad on the tube to which a bracket is welded for securing a shock absorber or similar means for dampening oscillations of the frame of the vehicle relative to the axle housing. In the past, the brake flange, the spring seat, and the shock absorber pad have all been formed from individual components which were welded, bolted, or otherwise secured to the tubes.

More recently, it has been found desirable to form the axle housing integrally by casting molten metal into an appropriately shaped mold. Thus, it is known to form the carrier and tubes of the axle housing from a single piece of material cast into a predetermined shape. Furthermore, it has also been found desirable to form the additional components of the axle housing (i.e., the brake flange, the spring seat, and the shock absorber pad) integrally with the tubes by casting. Known axle housing castings have been formed from nodular graphite iron material.

However, known axle housing castings have followed traditional thinking regarding the structures of the tubes. Specifically, the tubes of such known castings have been formed having uniform wall thicknesses, similar to the sections of hollow cylindrical steel tubing which were connected to the carriers of prior axle housings. However, it has been found that some portions of the axle housing tubes are subjected to relatively large stresses during operation, while other portions of the axle housing tubes are subjected only to relatively small stresses. In prior axle housings using a uniform wall thickness tube, the thickness of the tube was selected to accommodate the maximum stress applied at any point thereon. As a result, the remainder of the tube was over-designed for its intended use. In other words, the amount of material used to form the remainder of the tube was much larger than the amount required to prevent failure.

Thus, it can be seen that known axle housing castings are inefficient because they are composed of more material than is required to accomplish the intended function. The inclusion of the additional material in the known axle housing castings results in unnecessary material cost and increased weight. Since cost and weight are prime considerations in the design of axle housings and other vehicle components, it would be desirable to provide an improved axle housing casting which meets its intended functional requirements without adding unnecessary cost or weight thereto.

SUMMARY OF THE INVENTION

This invention relates to an improved structure for a housing for an axle assembly and a method for manufacturing same. The housing includes a tube which is formed by casting. The tube is cast having a brake flange, a spring seat, a shock absorber pad, and an outer end for mounting wheel bearings, all of which are integrally formed therewith. The tube is generally hollow and cylindrical in shape, but is formed having an outer circumferential surface which is generally circular in shape and an inner circumferential surface which is generally oval in shape. Thus, the wall thickness of the tube is not uniform about the circumference thereof. Rather, the wall thicknesses of the upper and lower portions of the tube are somewhat greater than the wall thicknesses of the side portions thereof. The wall thicknesses of the upper and lower portions of the tube are sized to accommodate vertically oriented loads induced therein which are generally larger than horizontally oriented loads which are normally encountered in use. The tube is cast from an iron alloy and is subjected to an austempering heat treatment process.

Various objects and advantages of this invention will become apparent to those skilled in the art from the following detailed description of the preferred embodiments, when read in light of the accompanying drawing.

DETAILED DESCRIPTION OF THE PREFERRED EMBODIMENTS

Figure 1:
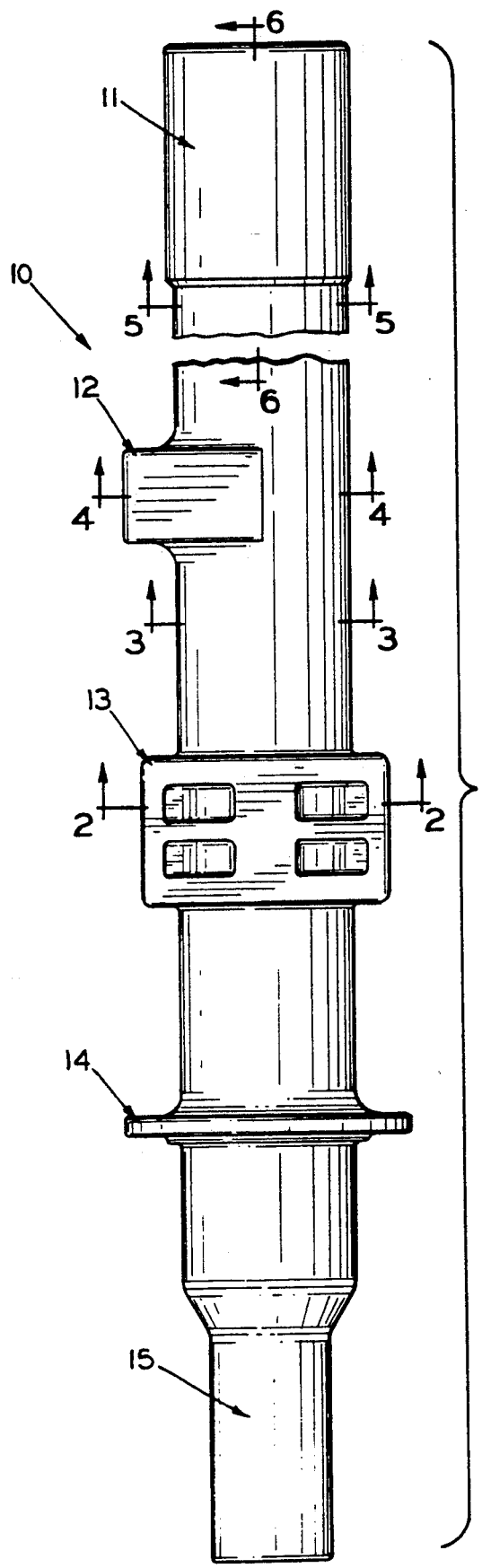
FIG. 1 is a top plan view of a rough casting for a tube adapted for use in an axle housing in accordance with this invention.
Figure 5:
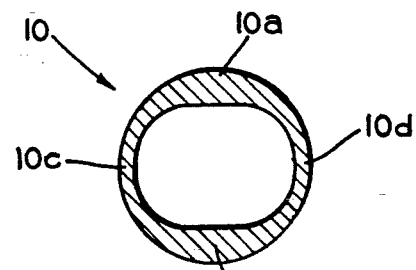
FIG. 5 is a sectional elevational view of the tube taken along line 5—5 of FIG. 1.
Figure 4:
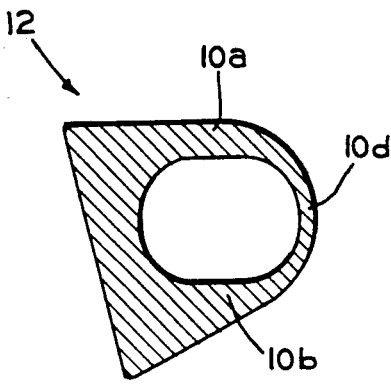
FIG. 4 is a sectional elevational view of the tube taken along line 4—4 of FIG. 1.
Figure 3:
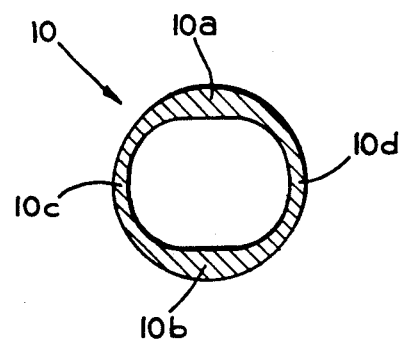
FIG. 3 is a sectional elevational view of the tube taken along line 3—3 of FIG. 1.
Figure 2:
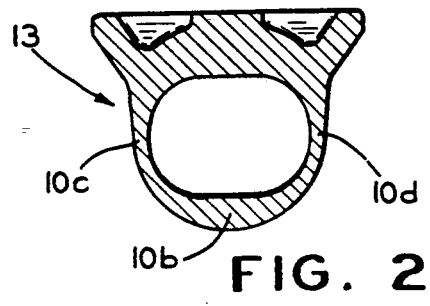
FIG. 2 is a sectional elevational view of the tube taken along line 2—2 of FIG. 1.

Referring now to the drawings, there is illustrated in FIGS. 1 through 6 an improved tube, indicated generally at 10, adapted for use as part of a housing for a vehicle axle assembly in accordance with this invention. The other components of the axle assembly are conventional in the art and form no part of this invention. The tube 10 is provided with an inner end 11 which is adapted to be secured to a carrier (not shown) of the axle housing. Additionally, the tube 10 is provided with a shock absorber pad 12, a spring seat 13, and a brake flange 14, the functions of which are all well known in the art. Lastly, the tube 10 is provided with an outer end 15 which is adapted to have bearings (not shown) mounted thereon for rotatably supporting a wheel on the tube 10. As will be explained in detail below, the tube 10 is formed by casting so that all of the above-mentioned components 11 through 15 are integrally formed therewith, as opposed to being formed from individual pieces secured to the tube 10.

As best shown in FIGS. 2 through 5, the tube 10 is generally hollow and cylindrical in shape. However, while the outer circumferential surface of the tube 10 is generally circular in shape, the inner circumferential surface thereof is generally oval in shape. Consequently, the wall thickness of the tube 10 is not uniform about the circumference thereof. Rather, the wall thicknesses of an upper portion 10a of the tube 10 and of a lower portion 10b of the tube 10 are somewhat larger than the wall thicknesses of a front side portion 10c of the tube 10 and of a rear side portion 10d of the tube 10.

In normal use, vertical and horizontal loads are imposed on the tube 10. The vertical loads are primarily generated by the weight of the vehicle. Thus, such vertical loads are imposed at the spring seat 13 (where the frame of the vehicle is connected to the tube 10) and at the outer end 15 (where the tube 10 is connected to the wheel bearings). The horizontal loads are primarily generated by acceleration and deceleration of the vehicle. Thus, such horizontal loads are imposed throughout the length of the tube 10. Structural analysis of the tube 10 under simulated operating conditions has revealed that the vertical loads imposed on the tube 10 are generally larger in magnitude than the horizontal loads imposed thereon.

The vertical loads imposed on the tube 10 create a bending moment throughout its length. This bending moment occurs primarily in the vertical plane, i.e., in the plane extending from the upper portion 10a of the tube 10 to the lower portion 10b. As a result, stresses are created within the tube 10, the magnitude of which are related to the magnitude of the bending moment. Since the bending moment of the tube 10 occurs primarily in the vertical plane, these loads are primarily vertically oriented within the tube 10.

However, because the primary bending moment occurs in the vertical plane, the front and rear side portions 10c and 10d of the tube 10 are subjected to loads which are much smaller in magnitude than the loads imposed on the upper and lower portions 10a and 10b. Thus, the wall thicknesses of such side portions 10c and 10d are sized to be less than the thicknesses of the upper and lower portions 10c and 10d.

As a result, the structure of the tube 10 provides for a more efficient use of the material used therein. In other words, the overall tube 10 possesses greater strength per unit weight of material used therein than prior known tubes. This is because less material is provided in the side portions 10c and 10d (where the lesser loads are imposed) than in the upper and lower portions 10a and 10b of the tube 10 (where the greater loads are imposed). This is in contrast to prior known tubes (both fabricated from pre-formed hollow cylindrical tubes and cast tubes), wherein the wall thickness of the tube was uniform throughout its circumference.

In the illustrated embodiment, the outer circumferential surface of the tube 10 is generally circular in shape. This can be done to make the tube 10 compatible with mating hardware (not shown) used to connect prior known tube designs to the vehicle. However, this invention contemplates that the outer circumferential surface of the tube need not be circular in shape. Similarly, the inner circumferential surface of the tube 10 need not be generally oval in shape. However, it has been found desirable to provide large radii transitions between each of the upper and lower portions 10a and 10b and each of the side portions 10c and 10d along the inner circumferential surface, thus creating the generally oval shape. The large radii transitions reduce the concentrations of stresses at such areas.

Figure 6:
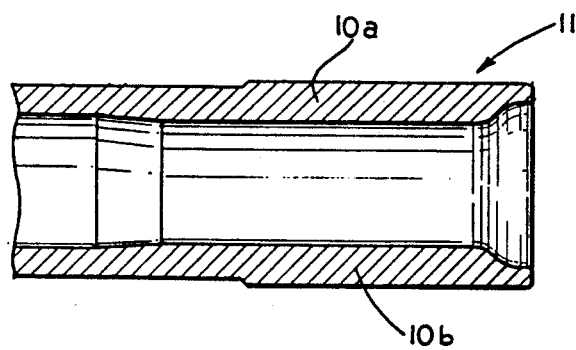
FIG. 6 is a sectional elevational view of the tube taken along line 6—6 of FIG. 1.

As best shown in FIG. 6, the inner end 11 of the tube 10 is formed having both an enlarged outer diameter and a reduced inner diameter. As mentioned above, the inner end 11 of the tube 10 is adapted to be secured to a carrier of the axle housing. The additional material on the outer circumferential surface of the inner end 11 is provided to permit a subsequent grinding operation to be performed thereon. Such grinding is performed to precisely size the outer diameter of the inner end 11 so that it precisely fits within a correspondingly sized aperture formed in the carrier. The additional material on the inner circumferential surface of the inner end 11 is provided to accommodate the loads and stresses imposed thereon by the connection of the tube 10 to the carrier.

Figure 7:
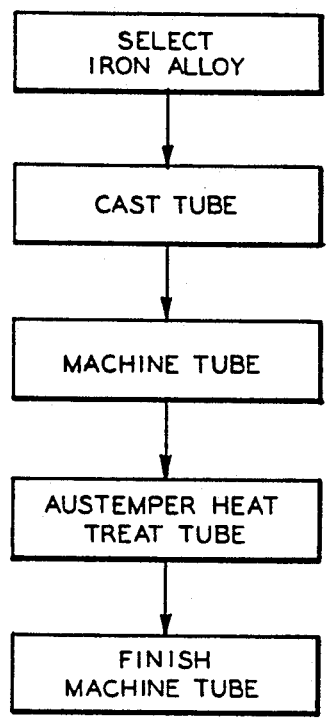
FIG. 7 is a flow chart illustrating the steps involved in the method for casting the tube shown in FIGS. 1 through 6.

Referring now to FIG. 7, a flow chart of the steps involved in the method for casting the tube 10 is illustrated. Initially, an alloy of ductile iron material is selected. The selected material preferably includes a predetermined amount of copper or predetermined amounts of copper and nickel in the iron alloy. The composition of the particular iron alloy will be dependent, among other things, upon the final hardness desired for the tube 10, as explained below. Once the desired iron alloy material is selected, such material is heated above its melting point and poured into a casting mold having the desired shape for the tube 10. The heated iron alloy material is then cooled to a solid in the mold and removed therefrom.

The resultant tube 10 is a relatively soft, easily machineable grade of cast iron alloy. Following this casting step, the tube 10 can be machined as desired. Such machining is well known in the art and can be performed on any conventional machining apparatus. For example, the outer circumferential surface of the inner end 11 of the tube 10 may be ground as described above to facilitate the connection of the tube 10 to a carrier. Also, apertures may be formed at various locations throughout the tube 10 to facilitate the connection of the tube 10 to other components of the vehicle. For reasons which will be explained below, it is preferable that no machining be performed on the outer surface of the outer end 15 of the tube 10 at this time.

Following the machining, the tube 10 is subjected to a heat treatment process to harden the casting to a desired hardness. In particular, an austempering heat treatment process is employed to harden the tube 10. In the austempering heat treatment process, the tube 10 is initially heated to a temperature above its critical temperature, the magnitude of which is dependent upon the particular composition of the iron alloy. The tube 10 is maintained at such temperature for a predetermined period of time which is dependent, among other things, upon the desired final hardness for the tube 10. Then, the tube 10 is rapidly cooled by quenching it in a salt bath to a relatively high temperature, approximately 400° F. to 500° F. The tube 10 is maintained at this temperature for a predetermined period of time, again dependent upon the desired final hardness for the tube 10.

By cooling the tube 10 in this manner, an austempered ductile iron microstructure is achieved therein. Such a microstructure is desirable because the tube 10 is both hard and ductile. The hardness of the tube 10 makes it capable of sustaining the static loads imposed thereon by the weight of the vehicle and normal operation. This is particularly applicable to use of the tube 10 in an on-road vehicle, wherein durability over a relatively long period of time is an important factor. The ductility of the tube 10 makes it capable of sustaining brief dynamic loads imposed thereon by impacts, such as by running over pot holes in the road. The nature of the austempering heat treatment process is such that little distortion is caused in the tube 10. Thus, the only machining of the tube 10 which is required after the austempering heat treatment process is on the outer end 15 of the tube 10, upon which the wheel bearings are to be mounted.

Figure 8:
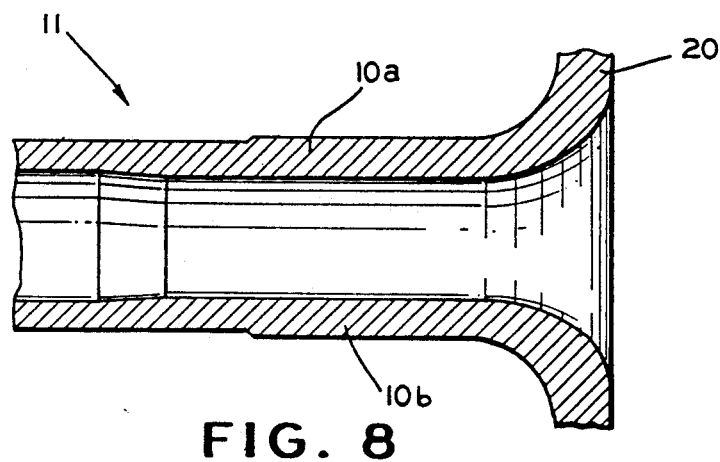
FIG. 8 is a sectional elevational view similar to FIG. 6 showing an alternate embodiment of the invention wherein the tube is cast integrally with a carrier of the axle housing.

The illustrated invention shows a tube 10 which, as mentioned above, is adapted for use as part of a housing for a vehicle axle assembly. In such housings, two of such tubes 10 are typically connected to a central carrier. This invention contemplates not only that each of the tubes be formed as a separate piece, as shown in the drawings, but also that the tube be cast integrally with the central carrier and with one another to form an integral axle housing. Referring to FIG. 8, there is illustrated an alternate embodiment of the invention wherein the inner end 11 of the tube 10 is cast integrally with a carrier 20 of the axle housing. The steps involved in forming the combined tube and carrier assembly are essential the same as described above. Also, it will be appreciated that the shape of the tube 10 can be varied from the illustrated generally cylindrical shape. For example, the tube may be formed having a generally square or rectangular cross sectional shape.

In accordance with the provisions of the patent statutes, the principle and mode of operation of this invention have been described and illustrated in its preferred embodiment. However, it must be understood that this invention may be practiced otherwise than as specifically explained and illustrated without departing from its spirit or scope.

What is claimed is:

1. An axle housing tube comprising:
a hollow body having an upper portion, a lower portion, and a side portion;
a first portion defined in said side portion of said body having a first wall thickness; and
a second portion defined in one of said upper and lower portions of said body having a second wall thickness, said second wall thickness being greater than said first wall thickness.

2. The axle housing tube defined in claim 1 further including a third portion defined in said body having a third wall thickness which is equal to said first wall thickness and a fourth portion defined in said body having a fourth wall thickness which is equal to said second wall thickness.

3. The axle housing tube defined in claim 2 wherein said first and third portions are located on opposed sides of said body, and wherein said second and fourth portions are located on opposed sides of said body.

4. The axle housing tube defined in claim 1 wherein said body is formed having an outer circumferential surface which is generally circular in shape.

5. The axle housing tube defined in claim 1 wherein said body is formed having an inner circumferential surface which is generally oval in shape.

6. The axle housing tube defined in claim 1 wherein said body is formed from an austempered ductile iron.

7. The axle housing tube defined in claim 1 wherein said body is form austempered ductile iron alloy.

8. The axle housing tube defined in claim 7 wherein said austempered ductile iron alloy includes copper.

9. The axle housing tube defined in claim 7 wherein said austempered iron alloy includes copper and nickel.

10. The axle housing tube defined in claim 1 wherein said body is provided with at least one of a shock absorber pad, a spring seat, and a brake flange.

11. The axle housing tube defined in claim 10 wherein said one of said shock absorber pad, said spring seat, and said brake flange are formed integrally with said body.

12. The axle housing tube defined in claim 1 wherein said body is connected to form an axle housing.

13. The axle housing tube defined in claim 12 wherein said body is formed integrally with said carrier.

14. An axle housing comprising:
a carrier; and
a pair of tubes extending outwardly from said carrier, each of said tubes including a hollow body having an upper portion, a lower portion, and a side portion, said hollow body further having a first portion defined in said side portion of said body having a first wall thickness and a second portion defined in one of said upper and lower portions of said body having a second wall thickness, said second wall thickness being greater than said first wall thickness.

15. The axle housing defined in claim 14 further including a third portion defined in each of said bodies having a third wall thickness which is equal to said first wall thickness and a fourth portion defined in each of said bodies having a fourth wall thickness which is equal to said second wall thickness.

16. The axle housing defined in claim 15 wherein said first and third portions are located on opposite sides of each of said bodies, and wherein said second and fourth portions are located on opposed sides of each of said bodies.

17. The axle housing defined in claim 14 wherein each of said bodies is formed having an outer circumferential surface which is generally circular in shape.

18. The axle housing defined in claim 14 wherein each of said bodies is formed having an inner circumferential surface which is generally oval in shape.

19. The axle housing defined in claim 14 wherein each of said bodies is formed from an austempered ductile iron.

20. The axle housing defined in claim 14 wherein each of said bodies is formed from an austempered ductile iron alloy.

21. The axle housing defined in claim 20 wherein said austempered ductile iron alloy includes copper.

22. The axle housing defined in claim 20 wherein said austempered ductile iron alloy includes copper and nickel.

23. The axle housing defined in claim 23 wherein said one said bodies is provided with at least one of a shock absorber pad, a spring seat, and a brake flange.

24. The axle housing defined in claim 23 wherein said one of said shock absorber pad, said spring seat, and said brake flange are formed integrally with each of said bodies.

25. The axle housing defined in claim 14 wherein each of said bodies is formed integrally with said carrier.

* * * * *

UNITED STATES PATENT AND TRADEMARK OFFICE
CERTIFICATE OF CORRECTION

PATENT NO. : 5,303,985
DATED : April 19, 1994
INVENTOR(S) : Mark C. Barnholt, John Oswald and Ronald I. Rhoads It is certified that error appears in the above-identified patent and that said Letters Patent is hereby corrected as shown below:

Column 6, Claim 7, line 2, after "is", change "form" to -- formed from an --.

Column 6, Claim 9, line 2, after "austempered", insert -- ductile --.

Column 6, Claim 12, line 2, after "to", insert -- a carier to --.

Column 6, Claim 16, line 2, after "on", change "opposite" to --opposed --.

Column 7, Claim 23, line 1, after "claim", change "23" to -- 14 --.

Column 7, Claim 23, line 1, after "wherein", insert -- each of --.

Column 7, Claim 23, line 2, before "bodies", cancel "one said".

Signed and Sealed this

Ninth Day of August, 1994

Attest:

BRUCE LEHMAN

*Attesting Officer*    *Commissioner of Patents and Trademarks*